Feb. 2, 1932.　　　I. R. McGOWEN　　　1,843,455
ELECTRIC HEATING UTENSIL
Filed April 5, 1930　　2 Sheets-Sheet 1
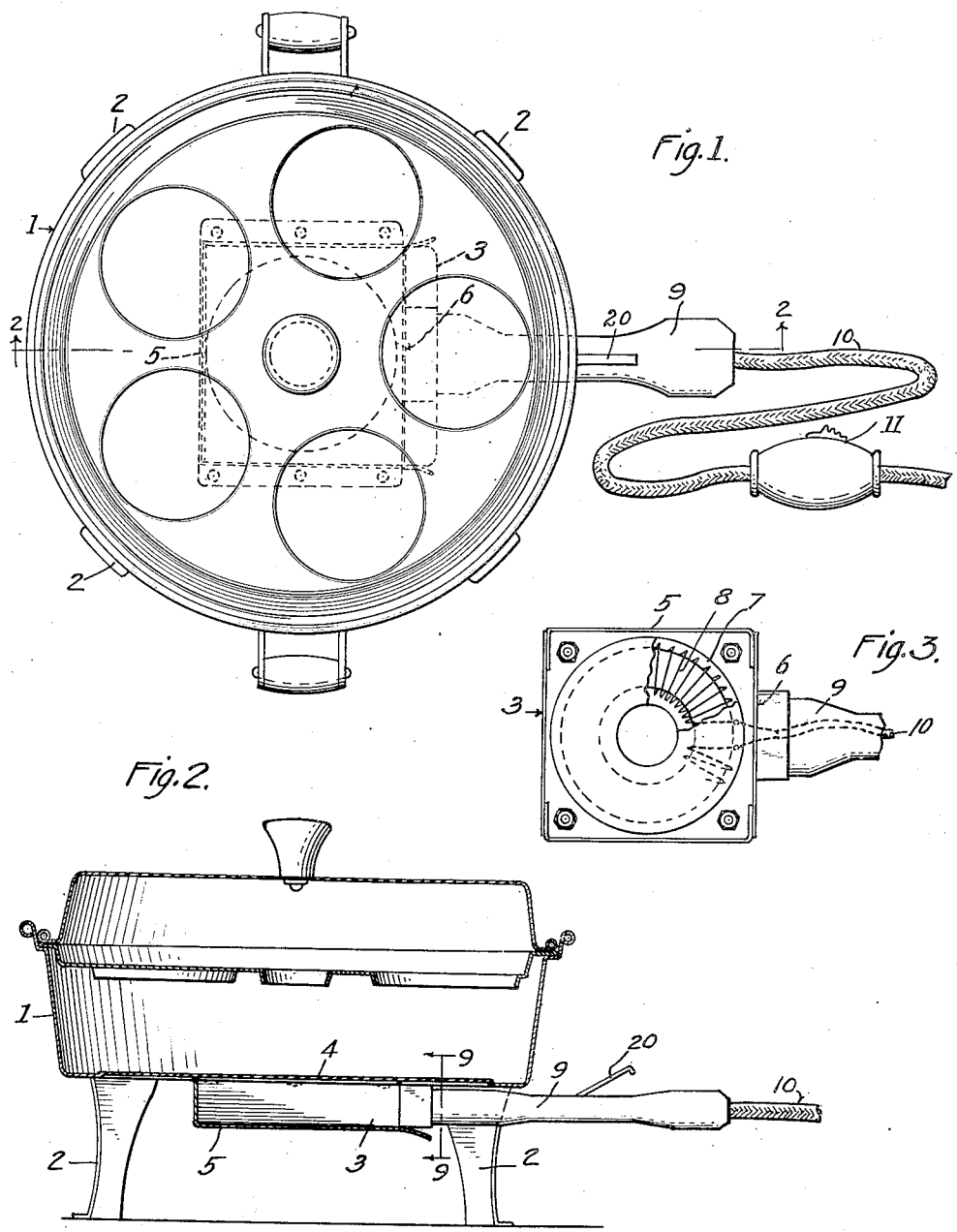
INVENTOR.
Ida R. McGowen,
BY Arthur P. Knight, Alfred W. Knight
ATTORNEYS Feb. 2, 1932.   I. R. McGOWEN   1,843,455
ELECTRIC HEATING UTENSIL
Filed April 5, 1930   2 Sheets-Sheet 2
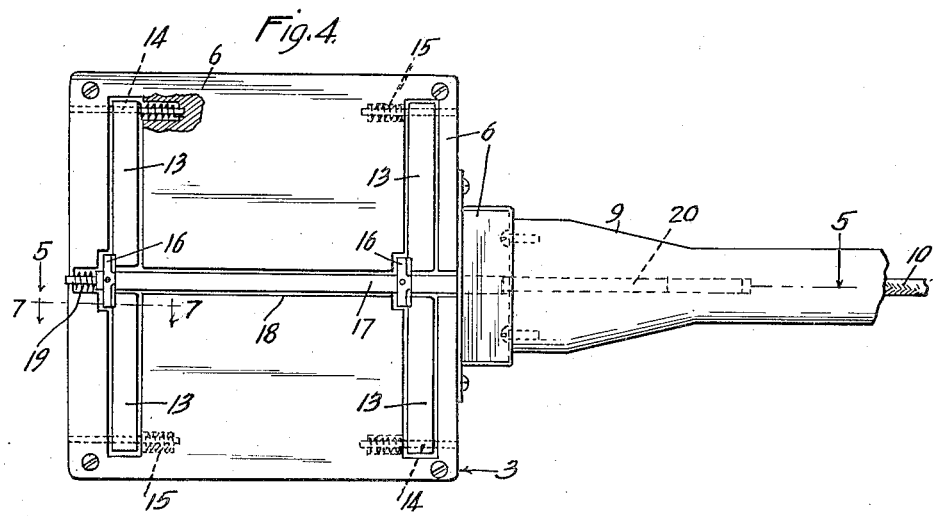
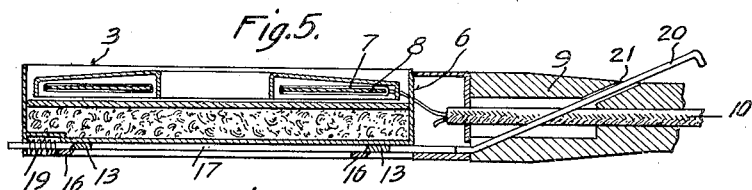
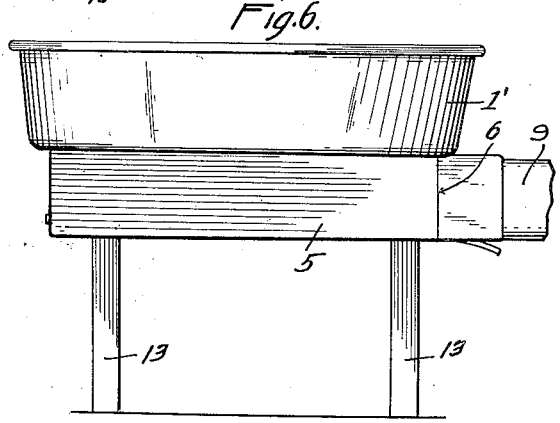
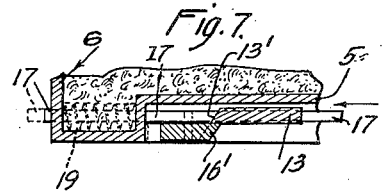
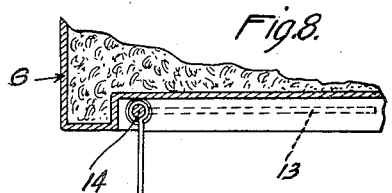
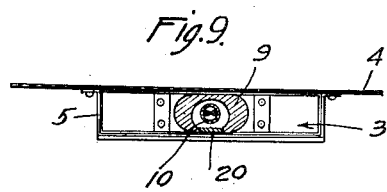
INVENTOR.
Ida R. McGowen,
BY Arthur P. Knight, Alfred W. Knight
ATTORNEYS Patented Feb. 2, 1932

1,843,455

UNITED STATES PATENT OFFICE

IDA R. McGOWEN, OF SAN PEDRO, CALIFORNIA

ELECTRIC HEATING UTENSIL

Application filed April 5, 1930. Serial No. 441,831.

This invention relates to electrical heating utensils, and the main object of the invention is to provide a food heating utensil, such as a chafing dish, percolator, toaster or the like in which the electric heating element is removable from the food containing or supporting portion of the utensil, so that the latter may be washed or cleaned more effectively than is possible when the heating means is mounted unseparably in the food containing means.

A further object of the invention is to provide a heating element that may be used interchangeably with different heating utensils. Another object of the invention is to provide an electrical heating element that is adapted to be used in conjunction with a food-heating utensil, and is also provided with means for supporting it independently of such utensil, for example, while it is cooling off or while it is being used for both heating and supporting a container.

The primary purpose of this invention is to disperse with the use of alcohol lamps in heating small quantities of food, for example, in serving food to guests in hotel rooms or at parties. By providing an electrical heating element separable from the food containing means, the use of such a heating lamp may be done away with, and at the same time the utensil is kept separable from the heating means, so as to retain the advantages as to convenience and sanitation resulting from such separability. The cooking or heating utensil, when the heating element is removed therefrom, can be washed effectively by submerging in water during the washing operation, whereas a utensil having an electrical heating element unseparably mounted therein or thereon, cannot be submerged in water, but must be cleaned in such manner as to avoid access of water to the heating element, such cleaning being inconvenient and also lacking in sanitary effectiveness.

The accompanying drawings illustrate an embodiment of the invention and referring thereto;

Fig. 1 is a plan view of a cooking utensil with the electric heating element in cooperative relation therewith.

Fig. 2 is a vertical section on line 2—2 in Fig. 1.

Fig. 3 is a partly broken plan view of the heating element.

Fig. 4 is a partly broken inverted plan view of the heating element

Fig. 5 is a section on line 5—5 in Fig. 4.

Fig. 6 is a side elevation of the heating element with its supporting means in extended position, this figure also showing a container mounted on the heating element.

Fig. 7 is a section on line 7—7 in Fig. 4.

Fig. 8 is a section on line 8—8 in Fig. 6.

Fig. 9 is a section on line 9—9 in Fig. 2.

In Fig. 1, a food heating utensil is indicated at 1, it being understood that this utensil may be a chafing dish, percolator, toaster or other means for containing or supporting the food to be heated, the term "food" as herein used including liquid as well as solid materials. The utensil 1 is provided with usual supporting means, such as legs 2, whereby the bottom of the utensil is elevated above the surface or body on which the utensil rests.

The electric heating means 3 is mounted on the utensil, preferably under the bottom 4 thereof, by suitable supporting means. For this purpose, a housing or pocket 5 of sheet metal may be attached to the bottom 4 of the utensil 1. For convenience and efficiency, the heating means 3 is preferably formed as a rectangular flat or plate-like member of relatively small height, but of considerable horizontal extension, and the housing 5 is shaped to loosely fit the heating means, so that the latter may be mounted thereunto or withdrawn therefrom. The heating means 3 is provided with frame 6 and an electric heating unit or coil 7, mounted on suitable insulating means 8 in said frame, and a handle 9 is attached to frame 6, to enable the heating means to be conveniently handled in inserting and withdrawing the same as hereinafter set forth. A suitable electric cord 10 is connected at one end to the heating element and at its other end is provided with usual plug means, not shown, for connection to an electrical service socket, a switch 11 being preferably connected in the cord to enable the heating current to be conveniently switched on or off.

In order to enable the electrical heating means to be supported independently of the utensil 1, when desired, it is preferably provided with collapsible or folding legs 13, which are pivoted at 14 to the frame 6 and which may be folded to compact position within recesses in the bottom of member 3 as shown in Figs. 4, 5 and 7 or may be extended as shown in Figs. 6 and 8. Springs 15 may be provided acting on the legs 13 to force them to extended or vertical position, and catch means normally hold the legs in folded position. Said catch means may consist of cross arms 16 on a bar 17 mounted to slide horizontally in a guide 18 on frame 6 and pressed by a spring 19 so as to normally hold the cross arms 16 under the legs 13 and retain said legs in folded position. A manually operated releasing bar 20 is mounted to slide in a channel 21 in handle 9 and is adapted to engage at its inner end with one end of bar 16 so as to move same back from under the legs 13 and permit the legs to move to extended position under the action of springs 15. The adjacent edge of catch arms 16 and legs 13 are beveled as shown at 16' and 13' in Fig. 7, so as to enable the leg 13 to pass the cross when said leg is returned to closed position, the leg pushing back the catch arm in this operation, against the action of spring 19. The springs 15 for actuating the legs are shown as coil springs adjacent the points 14 thereof, but it will be understood that any suitable form of springs may be employed.

In using the above described device, the electric heating device 3 is inserted within the housing or holder 5 on the bottom of the utensil 1, the legs 13 of the electric heating means being folded in position against or within the body of the heating means so as to enable it to be conveniently inserted within the housing or holder 5 and the electric heating means being manipulated by means of its handle 9 and the electric connections for said heating means being connected to any suitable service circuit for supply of electric energy to the heating element. Such supply may then be controlled by means of the switch 11. When the heating element is energized, the heat developed thereby is imparted through the bottom of the container or utensil 1 to the food or other material contained or supported thereby. It will be understood that the device described can be used for heating water or any other liquid or any food material or other material which it is desired to heat.

When the food containing or supporting utensil is not in use, the electric heating means 3 may be withdrawn therefrom and stored separately. As such electric heating means will generally be in heated condition when it is so withdrawn from the utensil, it is desirable to provide for supporting it out of contact with the surface, such as a table, on which it is supported, and for this purpose the member 20 may be operated manually to release the catch means 16 from the legs 13 and allow the latter to spring to extended position, as shown in Fig. 6, thereby holding the electric heating means a sufficient distance above the supporting surface to prevent any injury to such surface while the electric heating means is still hot. When the electric heating means is cooled off sufficiently the legs 13 thereof may be collapsed by manual operation and held in collapsed condition by operation of the cross arms 16.

If desired, the electric heating means may be used to support a heating utensil such as shown at 1' in Fig. 6, the heating utensil being in that case supported by the electric heating means, and the electric heating means being preferably held in elevated position by bringing the legs 13 thereof to extended position as shown in said figure.

By providing each of a plurality of utensils, such as a percolator, chafing dish, etc., with a housing or holder adapted to receive and hold the electric heating device, a single electric heating device may be used interchangeably with any one of such plurality of utensils, thereby securing a decided economy in the construction and operation of such utensil.

When the electric heating device has been withdrawn from the utensil 1, the latter may be washed or cleaned in the same manner as any ordinary utensil having no electric connections, for example, it may be immersed in water for the purpose of washing, and may thereby be sanitarily cleaned in a manner that would not be possible with a utensil containing an electric heating device liable to be damaged by access of water thereto.

I claim:

1. An electric heating device for electric heating utensils comprising a frame provided with recesses in its bottom and with a handle, an electric heating element mounted in said frame, electric connections for conducting current to said electric heating element, legs pivotally mounted within said recesses in said frame and adapted to fold on the frame, or to be extended transversely to the frame, and means for holding said legs in extended position.

2. An electric heating device for electric heating utensils comprising a frame provided with a handle, an electric heating element mounted in said frame, electric connections for conducting current to said electric heating element, legs pivotally mounted on said frame and adapted to fold within the frame, or to be extended transversely to the frame, spring means for moving said legs to extended position and holding them in that position, catch means for holding the legs in folded position, and manually operated means for releasing said catch means.

In testimony whereof I have hereunto subscribed my name this 29th day of March, 1930.

IDA R. McGOWEN.